(12) United States Patent
Chen et al.

(10) Patent No.: US 9,033,566 B2
(45) Date of Patent: May 19, 2015

(54) LIGHT GUIDING DEVICE AND A LIGHTING ASSEMBLY INCORPORATING THE SAME

(71) Applicant: Radiant Opto-Electronics Corporation, Kaohsiung (TW)

(72) Inventors: Wei-Hsuan Chen, Kaohsiung (TW); Yung-Hui Tai, Kaohsiung (TW); Chun-Yi Wu, Kaohsiung (TW)

(73) Assignee: RADIANT OPTO-ELECTRONICS CORPORATION, Kaohsiung (TW)

( * ) Notice: Subject to any disclaimer, the term of this patent is extended or adjusted under 35 U.S.C. 154(b) by 0 days.

(21) Appl. No.: 14/148,058

(22) Filed: Jan. 6, 2014

(65) Prior Publication Data
US 2014/0347888 A1 Nov. 27, 2014

(30) Foreign Application Priority Data
May 27, 2013 (TW) .............................. 102118628 A

(51) Int. Cl.
*F21V 7/04* (2006.01)
*F21V 8/00* (2006.01)

(52) U.S. Cl.
CPC .................... *G02B 6/0011* (2013.01)

(58) Field of Classification Search
CPC ... G02B 6/0055; G02B 6/0068; G02B 6/0011
USPC ........................................ 362/617, 613, 612
See application file for complete search history.

(56) References Cited

U.S. PATENT DOCUMENTS

| | | | |
|---|---|---|---|
| 6,328,453 B1 | 12/2001 | Ohkawa | |
| 6,752,507 B2 | 6/2004 | Wang et al. | |
| 7,493,010 B1* | 2/2009 | Lien et al. | 385/146 |
| 7,628,526 B2* | 12/2009 | Lee et al. | 362/607 |
| 8,324,640 B2* | 12/2012 | Jacob et al. | 257/98 |
| 2008/0205078 A1 | 8/2008 | Karlicek et al. | |

FOREIGN PATENT DOCUMENTS

| | | |
|---|---|---|
| CN | 201867506 U | 6/2011 |
| JP | 2004-171948 A | 6/2014 |
| TW | 201222037 A1 | 6/2012 |

OTHER PUBLICATIONS

Search Report of corresponding TW Patent Application No. 102118628 dated Jan. 23, 2015 (with English translation).
Search Report of CN Patent Application No. 2013102015153 dated Feb. 15, 2015 (with English translation).

* cited by examiner

*Primary Examiner* — Evan Dzierzynski
(74) *Attorney, Agent, or Firm* — Pepper Hamilton LLP

(57) ABSTRACT

A light guiding device includes a light input surface, a light output surface extending from a first edge of the light input surface, a connecting surface extending from a second edge of the light input surface, and a reflecting surface interconnecting the output surface and the connecting surface. Relationships of $\theta<\phi$, $\theta<\theta_T$ and $L \geq (AD)/\tan\theta$ are satisfied, where $\theta_T$ is a critical angle for total internal reflection, $\theta$ is an angle between extensions of the connecting surface and the light output surface, $\phi$ is an angle between the reflecting and light output surfaces, (L) is a distance between the second edge and the end edge, and (AD) is a distance between a location of incidence of a light beam on the light input surface and one of the first or second edge.

8 Claims, 3 Drawing Sheets

LIGHT GUIDING DEVICE AND A LIGHTING ASSEMBLY INCORPORATING THE SAME

CROSS-REFERENCE TO RELATED APPLICATION

This application claims priority of Taiwanese Application No. 102118628, filed on May 27, 2013.

BACKGROUND OF THE INVENTION

1. Field of the Invention

The invention relates to an optical device, more particularly to a light guiding device adapted to be used with a light source and a light guiding assembly incorporating the light guiding device and the light source.

2. Description of the Related Art

A long fluorescent lamp or multiple round light bulbs are often used in exhibition venues where sufficient lighting for a long or large display area is required. However, the light emitted by a single fluorescent lamp tends to be scattered and inefficient, and the light from multiple round light bulbs tends to overlap and is thus uneven. In addition, increasing the number of lamps also increases the costs of lighting.

A light guiding device is often used to regulate light emitted from a light source for a more even lighting effect. U.S. Pat. No. 6,328,453 and U.S. Pat. No. 6,752,507 disclose light guiding plates with micro structures formed thereon for controlling directions of light outputted from the light guiding plates to result in a relatively even lighting effect. However, designing and processing the micro structures on the light guiding plates increases the manufacturing complexity and costs.

SUMMARY OF THE INVENTION

Therefore, an object of the present invention is to provide a light guiding device that is able to manipulate an illuminating region without micro structures to alleviate the aforesaid drawbacks of the prior art.

According to the present invention, there is provided a light guiding device including a light guiding plate that has a light input surface, a light output surface, a connecting surface and a reflecting surface. The light input surface has first and second edges opposite to each other in a first direction. The light output surface extends from the first edge of the light input surface in a second direction transverse to the first direction, and has a distal edge opposite to the first edge of the light input surface. The connecting surface is opposite to the light output surface in the first direction, extends from the second edge of the light input surface, and has an inclined segment inclining away from the light output surface and terminating at an end edge. Extensions of the light output surface and the inclined segment of the connecting surface cooperatively define a first included angle therebetween. A distance between the second edge of the light input surface and the end edge of the connecting surface in the second direction is shorter than that between the first edge of the light input surface and the distal edge of said light output surface. The reflecting surface interconnects the end edge of the connecting surface and the distal edge of the light output surface, and cooperates with the light output surface to define a second included angle therebetween.

Relationships of $\theta<\phi$, $\theta<\theta_T$ and $L \geq (AD)/\tan\theta$ are satisfied, where $\theta_T$ is a critical angle for total internal reflection associated with the light guide plate, $\theta$ is the first included angle, $\phi$ is the second included angle, (AD) is a distance between a location of incidence of a light beam on the light input surface and one of the first edge and the second edge of the light input surface, and (L) is the distance between the second edge of the light input surface and the end edge of the connecting surface in the second direction.

The light guiding device further includes a reflecting member mounted to the reflecting surface of the light guiding plate.

Another object of the present invention is to provide a lighting assembly incorporating the above mentioned light guiding device. According to another aspect of the present invention, there is provided a lighting assembly that includes a light source and the aforesaid light guiding device for receiving light emitted from the light source.

The light guiding device of the lighting assembly further includes a reflecting member mounted to the reflecting surface of the light guiding plate for reflecting part of the light emitted from the light source toward the light output surface of the light guiding plate.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
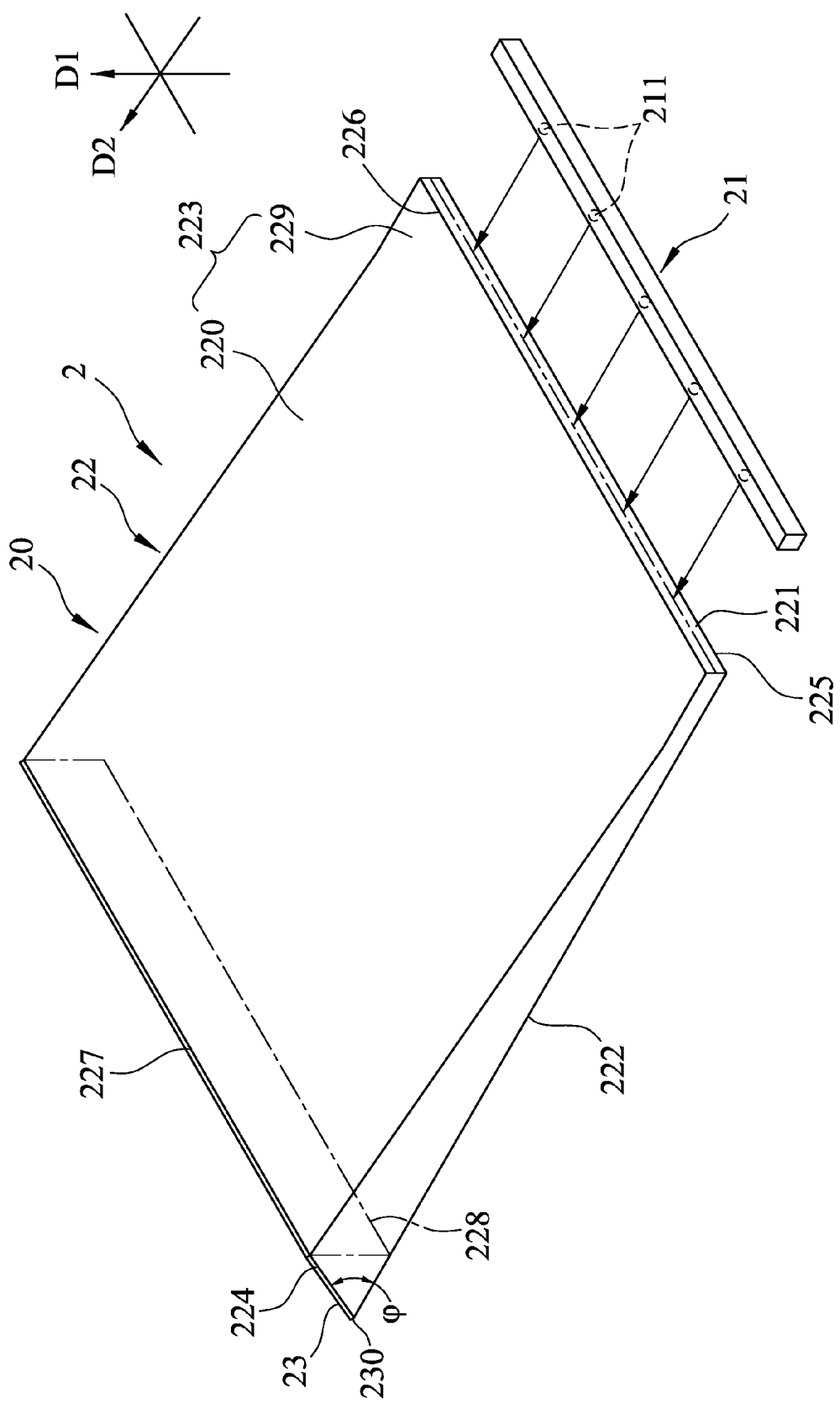
FIG. 1 is an exploded perspective view of a preferred embodiment of a lighting assembly according to the present invention.

With reference to FIG. 1, the preferred embodiment of a lighting assembly 2 according to the present invention includes a light guiding device 20 and a light source 21. The light guiding device 20 includes a light guiding plate 22 for receiving light emitted from the light source 21, and a reflecting member 23 mounted to the light guiding plate 22. In this embodiment, the light source 21 includes a plurality of light emitting diodes (LEDs) 211, but it is not limited thereto.

Figure 2:
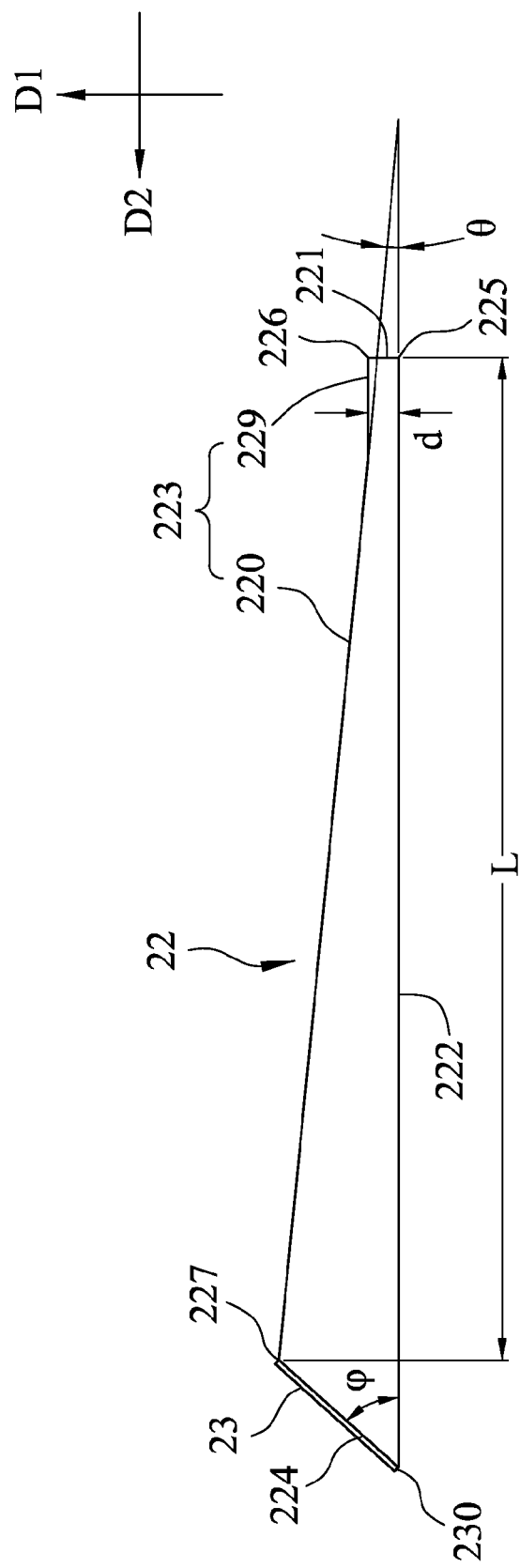
FIG. 2 is a side view of a light guiding device of the preferred embodiment.

With further reference to FIG. 2, the light guiding plate 22 has a light input surface 221, a light output surface 222, a connecting surface 223 and a reflecting surface 224. The light input surface 221 has a first edge 225 and a second edge 226 opposite to each other in a first direction (D1). The light output surface 222 extends from the first edge 225 of the light input surface 221 in a second direction (D2) transverse to the first direction (D1), and has a distal edge 230 opposite to the first edge 225 of the light input surface 221. The connecting surface 223 is opposite to the light output surface 222 in the first direction (D1), and has a straight segment 229 extending from the second edge 226 of the light input surface 221 and an inclined segment 220 extending from the straight segment 229, inclining away from the light output surface 222 and terminating at an end edge 227. In this embodiment, the straight segment 229 of the connecting surface 223 is parallel to the light output surface 222. The reflecting surface 224 interconnects the end edge 227 of the connecting surface 223 and the distal edge 230 of the light output surface 222. Extensions of the inclined segment 220 of the connecting surface 223 and the light output surface 222 cooperatively define a first included angle θ therebetween. The reflecting surface 224 and the light output surface 222 cooperatively define a second included angle $\phi$. A distance between the second edge 226 of the light input surface 221 and the end edge 227 of the connecting surface 223 in the second direction (D2) is shorter than that between the first edge 225 of the light input surface 221 and the distal edge 230 of the light output surface 222.

With the above mentioned configuration, relationships of $\theta<\phi$, $\theta<\theta_T$ and $L\geq(AD)/\tan\theta$ are satisfied, where $\theta_T$ is a critical angle for total internal reflection associated with the light guiding plate 22, (AD) is a distance between a location of incidence of a light beam on the light input surface 221 and one of the first edge 225 and the second edge 226 of the light input surface 221, and (L) is the distance between the second edge 226 of the light input surface 221 and the end edge 227 of the connecting surface 223 in the second direction (D2). The second included angle $\phi$ is a parameter for controlling an angle of beam exiting the light guiding plate 22, and the distance (L) and the first included angle $\theta$ are parameters for controlling a width of beam exiting the light guiding plate 22. These three parameters cooperatively control the luminous flux of the light exiting the light guiding plate 22.

The light guiding plate 22 further includes a reflecting member 23 mounted to the reflecting surface 224 of the light guiding plate 22. The light emitted by the light source 21 enters the light guiding plate 22 via the light input surface 221, and part of the light is reflected by the reflecting member 23 to exit the light guiding plate 22 through the light output surface 222.

Light guiding plates 22 of two different materials, Polycarbonate (PC) and Polymethylmethacrylate (PMMA), and with different dimensions are made for testing purposes. The tests were conducted with the light measured at the light input surface 221 is 90.67 lm, and the LEDs 211 of the light source 21 are linearly arranged and correspond in position to the central axis of the light input surface 221 (see FIG. 1), such that AD=(d/2) where (d) is the distance between the first edge 225 and the second edge 226 of the light input surface 221. The light output of each test group is measured in lm and percentages of the light output with respect to the light input are computed, and the test results are shown in Tables 1 and 2.

However, AD may vary depending on the position of the LEDs 221 that affect the angle and position a light beam passing through the light input surface 221. A condensed lighting effect may be achieved as long as AD is between 0.3 A and 0.7 A.

Referring to Table 1, test group (1) satisfies all the above mentioned three relationships where $\theta<\phi$ (11°<30°), $\theta<\theta_T$ (11°<42.16°) and $L\geq(d/2)/\tan\theta$ (79 mm>2.2 mm). Therefore, 90% efficiency is achieved. Test group (2) has a similar result to group (1), and test group (3) still achieves a 60% efficiency.

Test groups (4) to (7) show that the efficiency is reduced proximately to 50% or less if any of the three relationships is not satisfied.

TABLE 1

| Material | PMMA | | | | | | |
|---|---|---|---|---|---|---|---|
| Index of Reflection (n) | 1.49 | | | | | | |
| Critical Angle ($\theta_T$) | 42.16° | | | | | | |
| d (mm) | 4 | | | | | | |
| (d/2)/(tan$\theta_T$) (mm) | 2.2 | | | | | | |
| Flux of light at the light input surface (lm) | 90.67 | | | | | | |
| L (mm) | 79 | 79 | 79 | 79 | 79 | 2 | 79 |
| $\phi$ | 30 | 44 | 60 | 44 | 44 | 44 | 44 |
| $\theta$ (°) | 11 | 11 | 11 | 42.16 | 44 | 11 | 50 |
| Flux of light at the light output surface (lm) | 81.8 | 86.5 | 53.4 | 47.4 | 48.1 | 42.2 | 48.8 |
| Percentage of Light Output to Light Input (%) | 90.2 | 95.4 | 58.9 | 52.3 | 53 | 46.5 | 53.8 |
| Test Group Number | (1) | (2) | (3) | (4) | (5) | (6) | (7) |

Table 2 indicates similar results from experiments carried out with the light guiding devices 20 whose light guiding plates 22 are made of PC.

TABLE 2

| Material | PC | | | | | | |
|---|---|---|---|---|---|---|---|
| Index of Reflection (n) | 1.59 | | | | | | |
| Critical Angle ($\theta_T$) | 38.97° | | | | | | |
| d (mm) | 4 | | | | | | |
| (d/2)/(tan$\theta_T$) (mm) | 2.5 | | | | | | |
| L (mm) | 79 | 79 | 79 | 79 | 79 | 2 | 79 |
| $\phi$ | 30 | 44 | 60 | 44 | 44 | 44 | 44 |
| $\theta$ (°) | 11 | 11 | 11 | 42.16 | 44 | 11 | 50 |
| Flux of Light Input from the Light Guiding Plate (lm) | 81.8 | 84.1 | 43.3 | 46.2 | 46.7 | 41.7 | 47.5 |
| Percentage of Light Output to Light Input (%) | 90.2 | 95.4 | 47.7 | 50.9 | 51.5 | 46 | 52.4 |
| Test Group Number | (1) | (2) | (3) | (4) | (5) | (6) | (7) |

Figure 3:
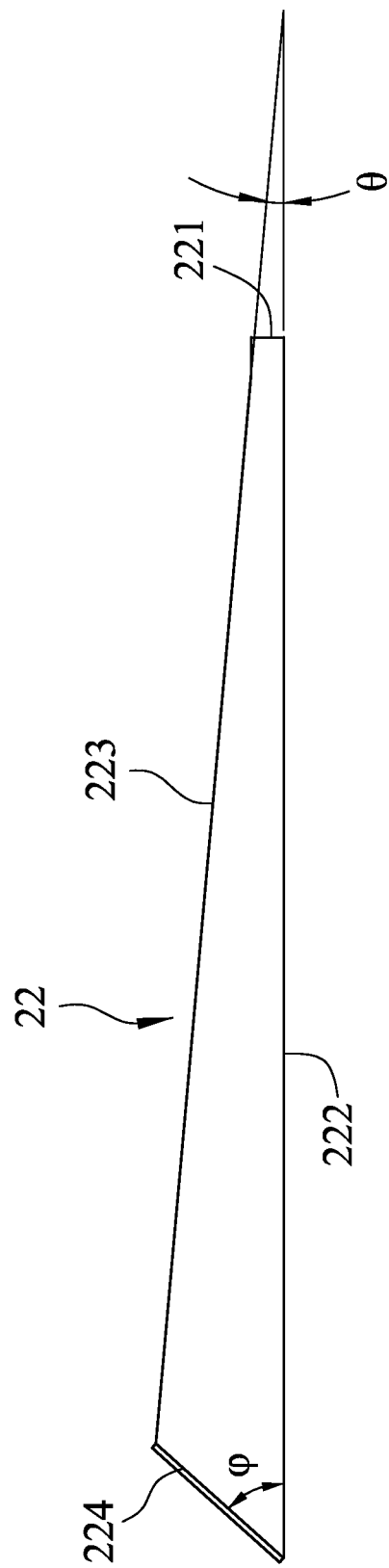
FIG. 3 is a side view of a variation of the light guiding device.

With reference to FIG. 3, an alternative design of the connecting surface 223 without any segment parallel to the light output surface 222 will obtain similar test results as shown in Tables 1 and 2.

To conclude, the lighting assembly 2 according to the present invention is able to regulate scattered light emitted from the light source 21 into an even light projection that is suitable for illuminating a large area. The parameters of the light guiding plate 22 can be changed during the manufacturing process to control the luminous flux of the light exiting the light guiding plate 22.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A light guiding device comprising:
a light guiding plate having
a light input surface that has first and second edges opposite to each other in a first direction,
a light output surface that extends from said first edge of said light input surface in a second direction transverse to the first direction, and that has a distal edge opposite to said first edge of said light input surface,
a connecting surface that is opposite to said light output surface in the first direction, that extends from said second edge of said light input surface and that has an inclined segment inclining away from said light output surface and terminating at an end edge,
extensions of said light output surface and said inclined segment of said connecting surface cooperatively defining a first included angle therebetween, a distance between said second edge of said light input surface and said end edge of said connecting surface in the second direction being shorter than that between said first edge of said light input surface and said distal edge of said light output surface, and
a reflecting surface that interconnects said end edge of said connecting surface and said distal edge of said light output surface, and that cooperates with said light output surface to define a second included angle therebetween,
relationships of $\theta<\phi$, $\theta<\theta_T$ and $L \geq (AD)/\tan\theta$ being satisfied, where $\theta_T$ is a critical angle for total internal reflection associated with said light guide plate, $\theta$ is the first included angle, $\phi$ is the second included angle, (AD) is a distance between a location of incidence of the light beam on said light input surface and one of said first edge and said second edge of said light input surface, and (L) is the distance between said second edge of said light input surface and said end edge of said connecting surface in the second direction; and
a reflecting member mounted to said reflecting surface of said light guiding plate.

2. The light guiding device of claim 1, wherein said connecting surface further has a straight segment that is connected between said inclined segment and said second edge of said light input surface, and that is parallel to said light output surface.

3. The light guiding device of claim 1, wherein AD=d/2 and (d) is a distance between said first edge and said second edge of said light input surface.

4. A lighting assembly comprising:
a light source capable of emitting light; and
a light guiding plate having
a light input surface that has first and second edges opposite to each other in a first direction,
a light output surface that extends from said first edge in a second direction transverse to the first direction, and that has a distal edge opposite to said first edge,
a connecting surface that is opposite to said light output surface in the first direction, and that has an inclined segment extending from said second edge and inclining away from said light output surface and terminating at an end edge,
extensions of said inclined segment and said light output surface cooperatively defining a first included angle therebetween, a distance between said second edge and said end edge in the second direction being shorter than that between said first edge and said distal edge, and
a reflecting surface that interconnects said end edge of said connecting surface and said distal edge of said light output surface, and that cooperates with said light output surface to define a second included angle therebetween,
relationships of $\theta<\phi$, $\theta<\theta_T$ and $L \geq (AD)/\tan\theta$ being satisfied, where $\theta_T$ is a critical angle for total internal reflection associated with said light guide plate, $\theta$ is the first included angle, $\phi$ is the second included angle, (AD) is a distance between a location of incidence of the light beam on said light input surface and one of said first edge and said second edge of said light input surface, and (L) is the distance between said second edge and said end edge of said connecting surface in the second direction; and
a reflecting member mounted to said reflecting surface of said light guiding plate.

5. The lighting assembly of claim 4, wherein said connecting surface further has a straight segment that is connected between said inclined segment and said second edge of said light input surface, and that is parallel to said light output surface.

6. The lighting assembly of claim 4, wherein AD=d/2 and (d) is a distance between said first edge and said second edge of said light input surface.

7. The lighting assembly of claim 4, wherein said light source includes a plurality of LEDs disposed linearly.

8. The lighting assembly of claim 7, wherein AD=d/2, (d) is a distance between said first edge and said second edge of said light input surface, and said LEDs are disposed to correspond in position to a central axis of said light input surface, hence the location of incidence of the light beam is at the centre of said light input surface of said light guide.

* * * * *